United States Patent [19]
Bennett et al.
[11] 3,818,118
[45] June 18, 1974

[54] SOLID STATE ELECTRONIC ELEMENT ENCAPSULATION WITH END CONTACTING BLISTER FORMATION

[75] Inventors: Kenneth R. Bennett, San Diego; Joseph W. Crownover, La Jolla, both of Calif.

[73] Assignee: GTI Corporation, Pittsburgh, Pa.

[22] Filed: June 21, 1973

[21] Appl. No.: 372,217

Related U.S. Application Data

[63] Continuation-in-part of Ser. No. 263,950, June 19, 1972, abandoned.

[52] U.S. Cl. ................ 174/52 S, 29/25.42, 29/619, 29/628, 317/242, 317/261, 338/329
[51] Int. Cl. .............................................. H05k 5/06
[58] Field of Search.................... 317/242, 258, 261; 338/330, 329; 106/53; 29/25.42, 619, 628; 174/52 S

[56] References Cited

UNITED STATES PATENTS 2,841,508 7/1958 Roup ................................. 317/258

*Primary Examiner*—E. A. Goldberg
*Attorney, Agent, or Firm*—William W. Haefliger

[57] ABSTRACT

A method of making extended electrical contact with the terminal of an encapsulated solid state electrical element involves confining noble metal oxide particles proximate the terminal within the envelop, and effecting heating of the particles to cause blister formation characterized by particle decomposition with oxygen release and formation of active noble metal surfaces urged into intimate contact with the chip terminal.

17 Claims, 7 Drawing Figures

SOLID STATE ELECTRONIC ELEMENT ENCAPSULATION WITH END CONTACTING BLISTER FORMATION

BACKGROUND OF THE INVENTION

This application is a continuation-in-part of our copending application Ser. No. 263,950, filed June 19, 1972, now abandoned and entitled, "Ceramic Chip Encapsulation With Terminal Contacting Blister Formation".

This invention pertains in general to an improved method of making electrical contact to solid state electrical elements when hermetically sealed within glass envelopes. The invention also concerns a method of maintaining an oxidizing atmosphere for such elements while being hermetically sealed within glass envelopes in non-oxidizing furnaces.

Glass envelopes have been in use by the semiconductor industry for hermetically sealing electrical components such as diode chips for more than twenty years. A number of patents have recently been issued to certain manufacturers using this old art to hermetically seal ceramic capacitor chips. The art practiced in these recent patents is effectively the same as the art described in the 20-year old patents, with the exception that they disclose a particular method or system of achieving electrical contact between the ceramic dice and the metal portions of the hermetically sealed envelopes.

U.S. Pat. No. 3,458,783 discloses the use of dissimilar metals to be used on the ceramic dice and the metal portions of the hermetically sealed envelope that forms a parent bond when subjected to the sealing temperature experienced during the fusion operation of the glass envelope. Another patent outlines the use of similar metals of a malleable nature with no parent bond. The procedures outlined in such patents and in the prior art pose a number of most serious electrical problems for high-quality capacitor and resistor devices, leaving much to be desired.

Basically, and in accordance with known art, a ceramic capacitor chip is placed within a round glass tube or sleeve that is subsequently closed at each end by metal plugs that abut against and make mechanical contact with the electrical terminals of the ceramic chip. These components—the glass sleeve, the ceramic chip, and the two metal plugs—are all held spatially in respect to each other within an assembly jig in readiness for a thermal sealing operation. Hermetic sealing is thereafter accomplished by heating the above-mentioned components as they are held in the assembly jig, to a temperature high enough to cause the glass sleeve to partially melt and fuse to the two metal plugs. This fusion of the glass to the metal plugs is capable of facilitating a full vacuum-tight seal around the ceramic chip. External leads are generally always attached to the metal plugs.

After cooling and removal from the assembly jig, it is found that electrical contacts have been established at the interface between the metal plugs and the electrical terminals of the ceramic chips by virtue of mechanical forces. This mechanical compression force is generated as a result of a small thermal coefficient of expansion differential existing between the chip and the glass sleeve of the fused package.

Mechanical pressure between two channeled metal plugs within a given glass sleeve and a ceramic ship generally results in only very few points of contact, because of the basically rough surfaces of the terminal of the ceramic chip and the surface of the metal plugs. Further, it is found that the areas of these contact points are extremely small, leading to serious limitations of the electrical utility of these devices for high frequency and high power applications. In some instances such an arrangement or method of packaging will result in a single point contact on either end of the ceramic chip which most seriously reduces the high frequency handling capability of an electrical capacitor, and greatly reduces the power handling ability of an electrical resistor.

A further fault with such prior developments lies in the fact that non-oxidizing gas atmospheres are used as the high temperature environment in which the glass cases are fused together. When ceramic capacitor chips of the general barium titanate dielectric-type are subjected to non-oxidizing atmospheres at temperatures the order of 700° to 800° C, a deterioration of these dielectrics takes place. This deterioration is most evident when one observes the leakage resistance of the capacitor chip after it has been subjected to the non-oxidizing atmospheric environment present during the encapsulation operation in available automatic sealing machines. Ceramic materials containing $BaTiO_3$ in their makeup must be formed and later sealed in oxidizing atmospheres in order to maintain relatively los-loss, high-permitivity dielectrics. Barium titanate fired under reducing atmospheres, such as the sealing environment of known sealers, loses oxygen from the crystal lattice, and conduction thereafter occurs, making the material unusable as a low-loss dielectric.

SUMMARY OF THE INVENTION

A major object of the invention is to provide a method of improving very substantially the interface connection between the electrical terminals of the ceramic chips and the metal plugs, thus greatly increasing the high frequency capability of the ceramic capacitors from the viewpoint of interface contact efficiency when hermetically sealed in glass cases. Another object concerns the preservation of high leakage resistance and high "Q" of barium titanate-type capacitor chips when they are subjected to non-oxidizing atmospheres at elevated temperatures the order of 700° to 800° C—i.e., the environmental conditions to which ceramic capacitor chips are subjected when being glass encased in automatic sealing machines.

Another object concerns the improvement of electrical connections between opposite ends of solid state electrical elements in general, and such metal plugs.

Basically, the method employs an electrically conductive material which has been found to increase in thickness when heated and remain in the expanded state after cooling. Mixtures of particulate oxides of certain noble metals, when dispersed in a suitable glass binder, will react with each other when subjected to a high enough flash heat-treating cycle. This reaction causes a multiple blistering or bubbling and foaming action to take place in a given printed test pattern resulting in an appreciable increase in the effective thickness of this test pattern. While this reaction imparts a highly defective appearance to the surface of the test pattern, it apparently exhibits no measurable lessening of the electrical conductivity of the material, but rather, to the contrary, it profoundly increases electrical conductivity.

This highly electrically conductive material also gives off relatively large quantities of oxygen when heated. The bubbling and blistering or foaming action that has been observed in these particulate materials when subjected to high temperature heat-treating cycles the order of 700° to 800° C is the result of oxygen being given off as decomposition of the particulate of precious metal oxides occurs. The bubbles that are formed and trapped in the glassy pahse of these materials contain almost pure oxygen.

The method of the invention may, then, be characterized by the steps that include confining noble metal oxide particles, for example in paste form, proximate the end of a solid state electrical element in an encapsulating envelope (as for example a glass sleeve), and effecting heating of the particles to cause blister formation characterized by particle decomposition with oxygen release and formation of active noble metal surfaces urged into intimate electrical contact with the element end, which may have an irregular surface. The oxygen release adjacent the element counteracts the otherwise disadvantageous effects of the reducing atmosphere environment of the sealing apparatus operable to fuse the glass envelope to the electrode plug or plugs, as will be seen. A further aspect of the invention concerns the product formed by the described method.

These and other objects and advantages of the invention, as well as the details of an illustrative embodiment, will be more fully understood from the following description and drawings, in which:

DRAWING DESCRIPTION

DETAILED DESCRIPTION

Figure 1:
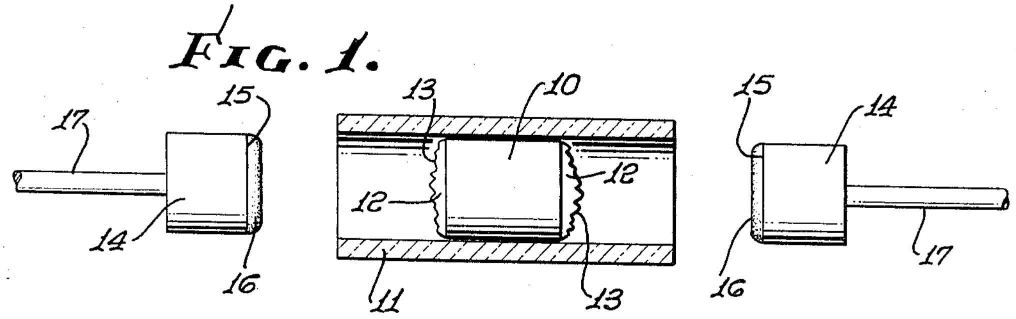
FIGS. 1 – 3 are elevations taken in section to show different stages in the method of encapsulation.

Referring to FIG. 1, a ceramic chip 10 is shown positioned in a glass sleeve or tube 11, the chip having end terminals 12 with irregular surfaces 13, exaggerated for illustration purposes. The chip may, for example, consist of a barium titanate ceramic capacitor, or an electrical resistor, these being examples of impedance elements. Chip 10 may also be considered to represent solid state electrical elements in general, as may also include silicon diode chips (monocrystalline) and glass based resistor and capacitor elements. Electrodes in the form of metal plugs 14 are shown outside the sleeve ends, with noble metal oxide particles applied to the ends 15 of the plugs, the particles for example dispersed in a volatile hydrocarbon carrier to form a paste 16 adhering to the plug ends. As an example, a particulate composed of highly oxidized palladium and silver metal powder may be dispersed in a $PbO$-$B_2O_3$-$SiO_2$ glass grit, and the mixture may be milled to suitable fineness to form a viscous paste or printable ink when combined with a suitable organic vehicle, such as plasticized and thinned ethyl cellulose. For this purpose, about 30 grams of palladium oxide, plus about 10 grams of silver powder may be mixed with about 60 grams of grit. The grit ingredients may be in the approximate porportions 48 grams of $PbO$, 4.8 grams of $B_2O_3$, 7.2 grams of $SiO_2$. The paste is applied to the flat surfaces 15 of the end plugs so as to exist at, and act as the interface between, the plugs 14 and terminals 12 of the chip 10.

Figure 2:
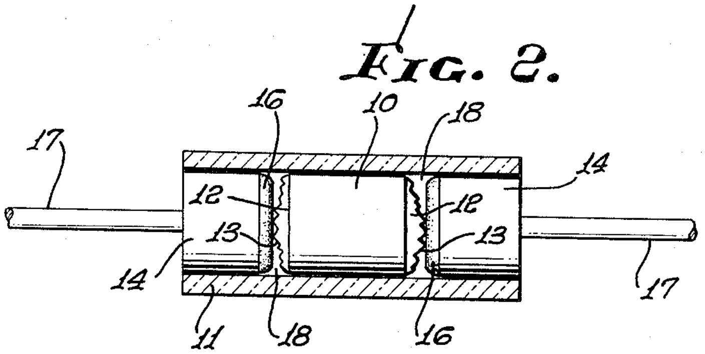

In FIG. 2, the plugs 14 have been inserted into the glass sleeve 11, with the noble metal paste 16 in contact with the outermost tips of the irregular surfaces 13 of the terminals 12, wire leads 17 projecting endwise oppositely from the plugs with which they are integral. Note the relatively large voids 18 between the metal plug and chip elements, and which would preclude the establishment of good thermal contact as required in the case of resistive chips, or of good high frequency contact in the case of capacitor chips.

Figure 3:
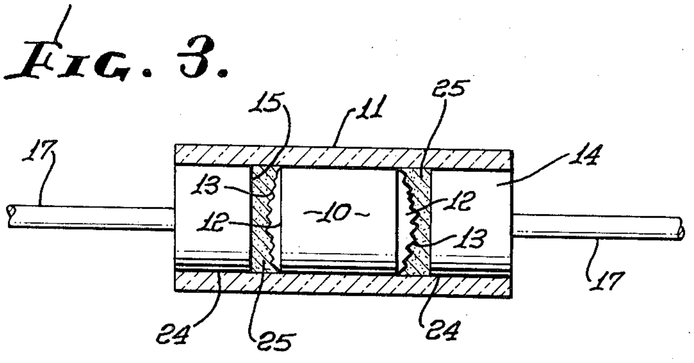
Figure 4:
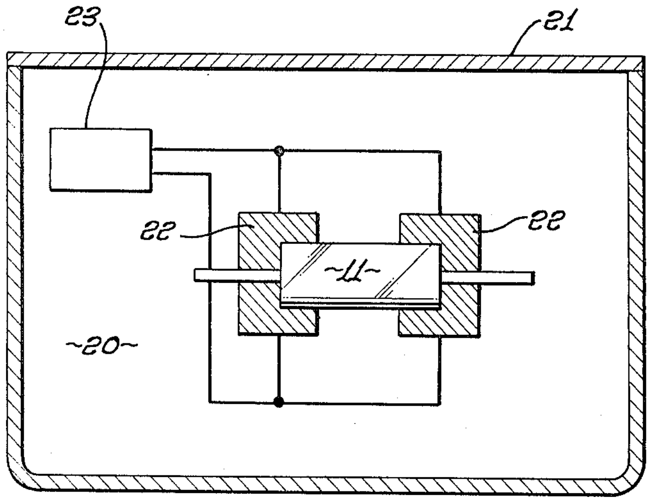
FIG. 4 is a view, in sectional elevation, of heating equipment for sealing the capsule.

In FIG. 4, the assembly is shown subjected to heating, as within a non-oxidizing atmosphere 20 inside enclosure 21, gases such as nitrogen, argon, helium, hydrogen or combinations of same being employed. Graphite boats or carriers 22 are received over the ends of the sleeve, and electrical current from a source 23 is supplied to the boats to achieve heat sealing temperatures on the order of 700° to 800° C, effecting formation of glass to metal bonds between the sleeve and metal plugs. Such gastight bonds are shown at 24 in FIG. 3.

Also seen in FIG. 3 are blisters 25 filling the boids 18 and characterized by active noble metal surfaces in extended and intimate contact or engagement with the irregular surfaces 13 of terminals 12, as well as with the end faces 15 of the metal plugs. These blisters are formed as a result of heat transmission to the paste 16 during the FIG. 4 sealing operation, the noble metal particulate having expanded. The noble metal oxide decomposes, with release of oxygen to generate active noble metal surfaces welding into chain-like metallic aggregates of very low ohmage. Further, the oxygen release after completion of hermetic sealing as described produces a local, entrapped oxydizing atmosphere within the package preventing deterioration of the ceramic capacitor chip, despite the existence of the reducing atmosphere 20 outside the capsule.

Palladium powder when heated begins to oxidize at about 450° C, and proceeds to substantially complete formation of palladium oxide (13 percent weight gain) at about 800° C. If heated beyond 800° C, it rapidly loses oxygen. The presence of metallic silver powder causes decomposition to begin at lower temperatures, i.e., around 700° C. It will be understood that noble metals other than palladium are also useful, an example being ruthenium oxide. Thus, 30 grams of ruthenium oxide may be combined with 10 grams of silver powder and mixed with 60 grams of grit, as described to form the paste.

Gold powder may alternatively be employed in place of silver powder, or in partial substitution thereof. In this regard, it has been found that the use of gold aids in achieving lower contact resistance to many components. Between ½ percent and 12 percent by weight of gold powder, when added to the palladium oxide and/or ruthenium oxide plus silver powder systems described above, has proven to be of excellent utility in achieving lower contact resistance, about 10 percent gold being optimum; however, the addition of too much gold, i.e., over about 15 percent, results in reduced blister formation, which is undesirable.

Figure 5:
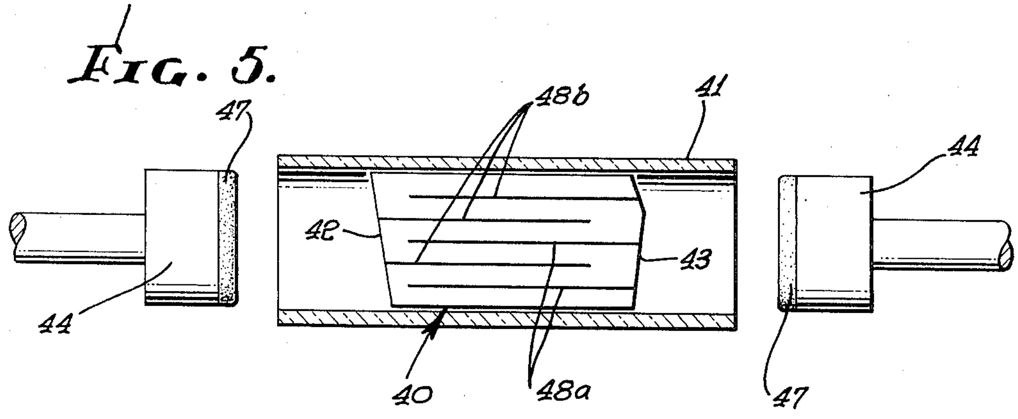
FIGS. 5 – 7 are elevations similar to those seen in FIGS. 1 – 3.
Figure 6:
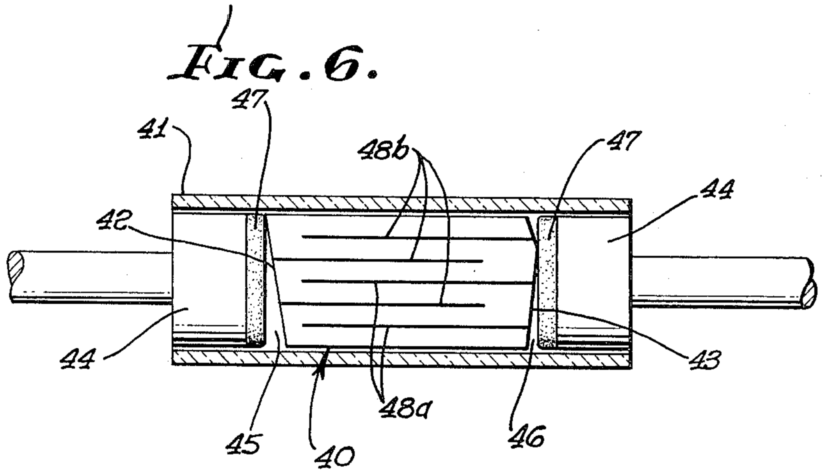
Figure 7:
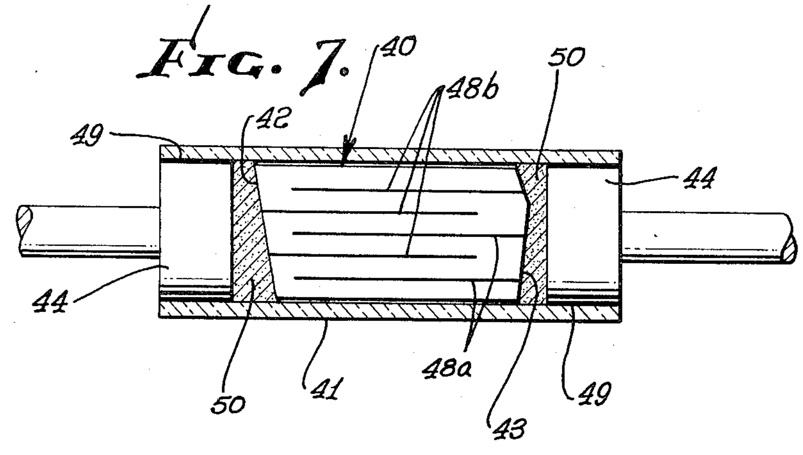

FIG. 5 shows an arrangement similar to FIG. 1, with a ceramic chip 40 positioned in glass sleeve 41. In this example, there are no separate terminals on the chip, the unterminated and irregular ends being designated at 42 and 43. FIG. 6 shows the assembly prior to thermal treatment, with plug electrodes 44 inserted into opposite ends of the sleeve. Voids 45 and 46 exist between the ends 42 and 43 of the chip and the paste 47 on the plugs, such paste corresponding to the described paste at 16 in FIGS. 1–3. At this point, few or none of the ends of the electrodes 48*a* and 48*b* on the chip are contacted by the paste. FIG. 7 shows the fully sealed chip, the plugs being sealed to the glass sleeve at 49, and the paste having been converted to blisters 50 in response to heating, as previously described. Voids 45 and 46 are filled, and the ends of electrodes 48*a* and 48*b* are fully contacted by the electrically conductive noble metal structure in the blisters.

We claim:

1. The method of making extended electrical contact with the end of a solid state electrical element within an envelope, that includes a. confining noble metal particles proximate said end within the envelope, certain of said particles selected from the first group consisting of palladium oxide and ruthenium oxide, and other of the particles selected from the second group consisting of silver powder and gold powder, and b. effecting heating of the particles to cause blister formation characterized by decomposition of said certain particles with oxygen release, and formation of active noble metal surfaces urged into intimate contact with the end of said solid state electrical element.

2. The method of claim 1 wherein the envelope comprises an encapsulating glass sleeve, and including the step of fitting an electrode plug to the sleeve to confine said particles between the plug and said end of the element.

3. The method of claim 2 wherein said confining step is carried out by applying the particles in paste form to the plug prior to fitting of the plug to the sleeve.

4. The method of claim 1 wherein said element consists of a ceramic chip having end terminals.

5. The method of claim 4 wherein said chip consists of a barium titanate ceramic capacitor.

6. The method of claim 1 wherein said element consists of an electrical resistor.

7. The method of claim 1 wherein said element consists of a diode.

8. The method of claim 1 wherein the particles are dispersed in a lead oxide, boron oxide, silicon oxide grit.

9. The method of claim 1 wherein the particles are dispersed in an organic carrier to form a paste.

10. The method of making extended electrical contact with opposite ends of a solid state electrical element within a glass sleeve to which electrode plugs are fitted proximate said opposite ends of the element, that includes a. confining noble metal particles between the plugs and said ends of the element and in a reducing gas environment, certain of said particles selected from the first group consisting of palladium oxide and ruthenium oxide, and others of the particles selected from the second group consisting of silver powder and gold powder, and b. transferring heat to the particles from the exterior of the sleeve and plugs to cause blister formation characterized by decomposition of said certain particles with oxygen release, and formation of active noble metal surfaces urged into intimate contact with said opposite ends of the solid state electrical element.

11. The method of claim 10 including the step of fusing the sleeve to the plugs at elevated temperature to hermetically seal the elements in the sleeve.

12. An electrical structure, comprising a. a solid state electrical element and a capsule containing said element, there being an electrode carried by the capsule and the element having an end spaced from the electrode within the capsule, and b. a blister formation within said space in the capsule and characterized by active noble metal surfaces in extended engagement with said end and electrode and by oxygen containing voids within the blister formation, the blister metal selected from a first group which consists of palladium and ruthenium, and also from a second group which consists of silver and gold.

13. The structure of claim 12 wherein the capsule consists of a glass sleeve, the element has another end, and a second blister formation as defined in extended contact with said other end of the element, and there being electrode plugs fused to the sleeve and the plugs having faces in extended electrical contact with the blister formations.

14. The structure of claim 13 wherein the element consists of a ceramic chip.

15. The structure of claim 14 wherein the chip consists of a barium titanate ceramic capacitor.

16. The structure of claim 13 wherein the element consists of an electrical resistor.

17. The structure of claim 13 and wherein the element consists of a diode.

* * * * *